(12) United States Patent
Perichon et al.

(10) Patent No.: US 10,844,950 B2
(45) Date of Patent: Nov. 24, 2020

(54) TRANSMISSION SHIFTER SYSTEM

(71) Applicant: Robert Bosch Automotive Steering LLC, Northville, MI (US)

(72) Inventors: Olivier Perichon, Independence, KY (US); Ricky Mains, Morning View, KY (US)

(73) Assignee: Robert Bosch Automotive Steering LLC, Northville, MI (US)

( * ) Notice: Subject to any disclaimer, the term of this patent is extended or adjusted under 35 U.S.C. 154(b) by 130 days.

(21) Appl. No.: 16/113,389

(22) Filed: Aug. 27, 2018

(65) Prior Publication Data

US 2019/0063594 A1   Feb. 28, 2019

Related U.S. Application Data

(60) Provisional application No. 62/551,462, filed on Aug. 29, 2017.

(51) Int. Cl.

| *F16H 59/10* | (2006.01) |
| *F16H 25/18* | (2006.01) |
| *F16H 61/36* | (2006.01) |
| *B60K 20/06* | (2006.01) |

(52) U.S. Cl.
CPC .............. *F16H 59/10* (2013.01); *B60K 20/06* (2013.01); *F16H 25/186* (2013.01); *F16H 61/36* (2013.01)

(58) Field of Classification Search
CPC ... B60K 20/06; F16H 59/10; F16H 2059/026; F16H 25/186; Y10T 74/1896; Y10T 74/20146

See application file for complete search history.

(56) References Cited

U.S. PATENT DOCUMENTS

| 1,819,688 | A | * | 8/1931 | Moore | B60K 26/02 477/165 |
| 2,301,816 | A | * | 11/1942 | Rubly | F16H 61/36 74/484 R |
| 2,924,988 | A | * | 2/1960 | Primeau | F16H 59/04 74/473.3 |
| 3,808,907 | A | * | 5/1974 | Yamaguchi | B62M 25/04 74/471 XY |
| 4,733,573 | A | * | 3/1988 | Kramer | B60K 20/06 74/107 |
| 4,779,477 | A | * | 10/1988 | Horton | F16H 59/02 74/473.11 |
| 4,955,935 | A | * | 9/1990 | Katayama | B60K 20/06 192/220.2 |
| 5,378,179 | A | * | 1/1995 | Riggle | B63H 21/265 440/59 |
| 5,492,031 | A | * | 2/1996 | Hedderly | B60K 20/06 200/61.27 |
| 5,729,187 | A | * | 3/1998 | Moody | F16H 61/22 192/218 |

(Continued)

*Primary Examiner* — Bobby Rushing, Jr.
(74) *Attorney, Agent, or Firm* — Schaffer, Schaub & Marriott, Ltd.

(57) ABSTRACT

A shifter for the transmission of a vehicle is described. The shifter has a shift lever operatively connected to the transmission. A rotatable shaft is connected to the lever. A lateral movement device is operatively connected to the shaft. A cable pin is positioned on the lateral movement device and connected to the shift mechanism for the transmission.

7 Claims, 3 Drawing Sheets

(56) References Cited

U.S. PATENT DOCUMENTS

| | | | | |
|---|---|---|---|---|
| 6,327,928 B1 * | 12/2001 | Bowerman | ............ | B60K 20/06 |
| | | | | 74/473.15 |
| 6,810,761 B2 * | 11/2004 | Teijeiro Castro | ....... | F16H 61/36 |
| | | | | 74/473.1 |
| 8,113,081 B2 * | 2/2012 | Reppuhn | ................ | F16H 59/10 |
| | | | | 74/473.3 |
| 8,857,851 B2 * | 10/2014 | Clark | .................... | B62D 1/189 |
| | | | | 280/775 |
| 2005/0066760 A1 * | 3/2005 | Takikawa | ............... | B60K 20/08 |
| | | | | 74/473.31 |

* cited by examiner

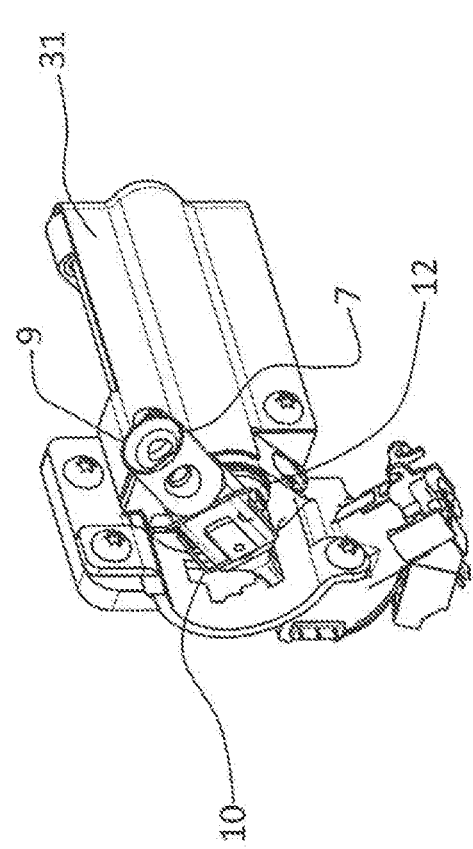
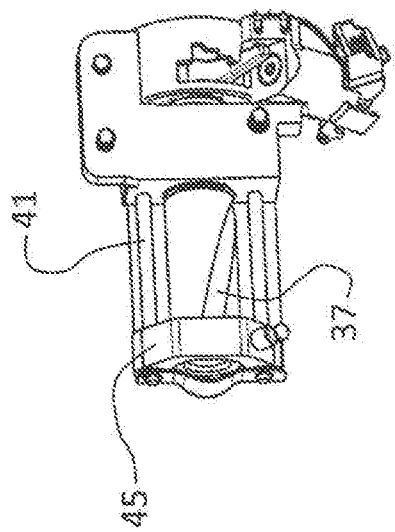
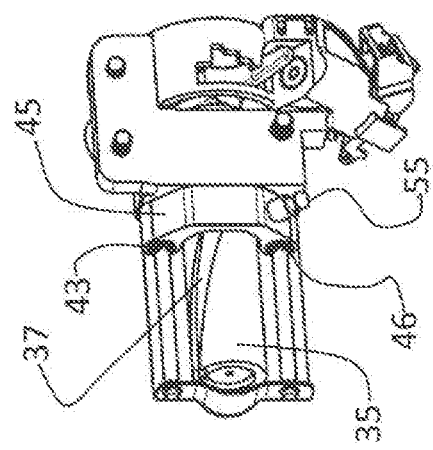
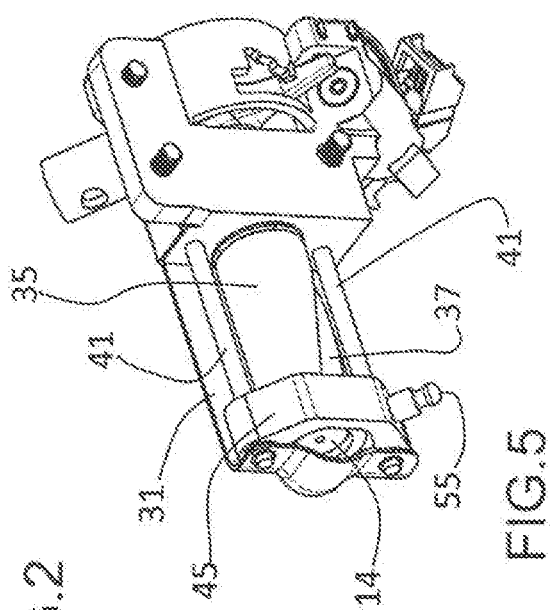

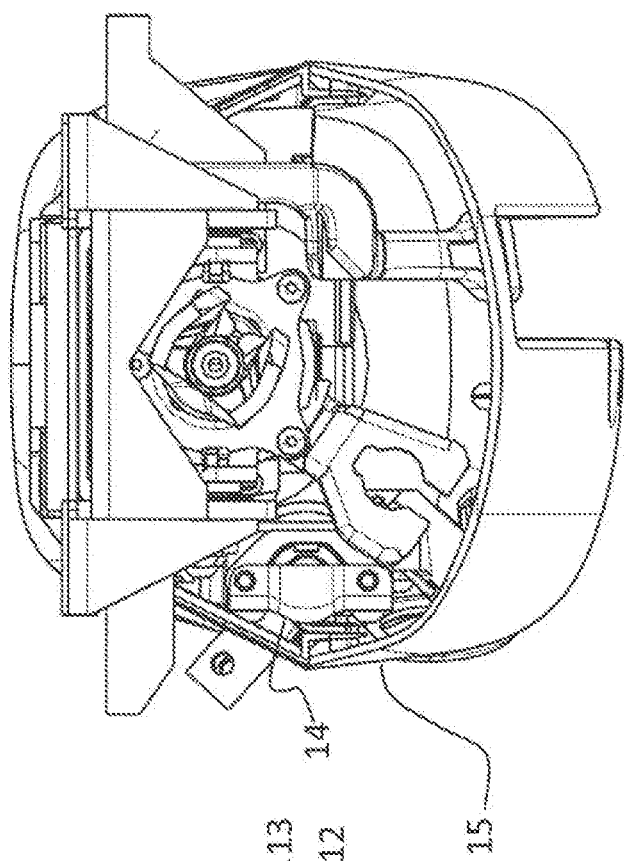
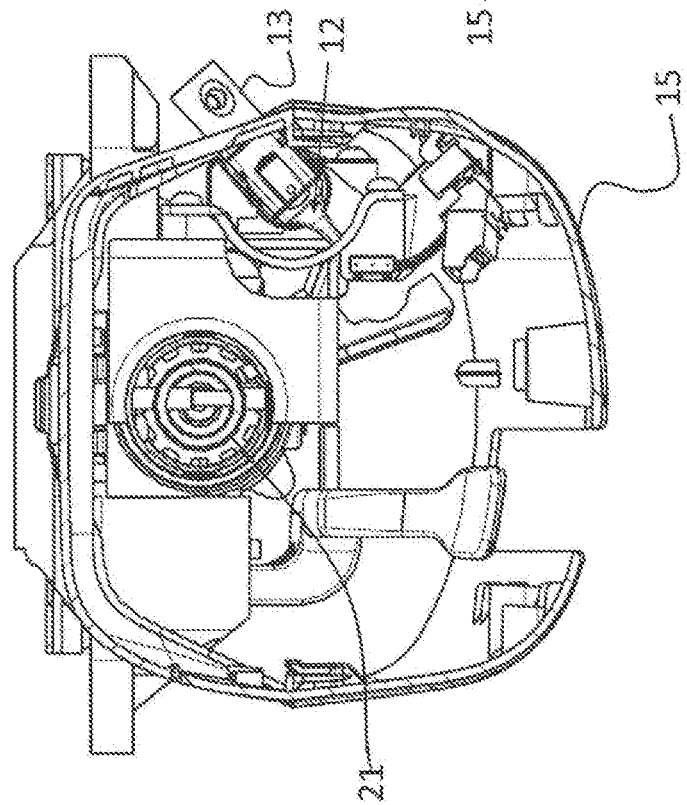
FIG. 6
FIG. 7

TRANSMISSION SHIFTER SYSTEM

CROSS REFERENCE TO RELATED APPLICATIONS

This application claims the benefit of U.S. provisional patent application Ser. No. 62/551,462 filed on Aug. 29, 2017.

BACKGROUND OF THE INVENTION

The present invention is directed to a shifter that can be used to shift the transmission of a vehicle. In current vehicles, the shifter for the transmission is frequently located adjacent the steering column for the vehicle. The shifters use a linkage system that translates motion of the shift lever into movement of the shift linkage that shifts the transmission of the vehicle. The linkage system takes up space in the area of the steering column and frequently detracts from the appearance of the steering column and dash area of the vehicle. Accordingly, there is a need in the industry for a shifter that takes up less space while still providing a smooth shifting motion.

SUMMARY OF THE INVENTION

A shifter for the transmission of a vehicle is described. The shifter has a shift lever operatively connected to the transmission. A rotatable shaft is connected to the lever. A lateral movement device is operatively connected to the shaft. A cable pin is positioned on the lateral movement device and connected to the shift mechanism for the transmission.

Other objects and advantages of the present invention will become apparent to those skilled in the art upon a review of the following detailed description of the preferred embodiments and the accompanying drawings.

IN THE DRAWINGS

FIG. 2 is a perspective view.

FIG. 3 is a perspective view.

FIG. 4 is a perspective view.

FIG. 5 is a perspective view.

FIG. 6 is a front elevational view.

FIG. 7 is a rear elevational view.

DETAILED DESCRIPTION OF THE INVENTION

Figure 1:
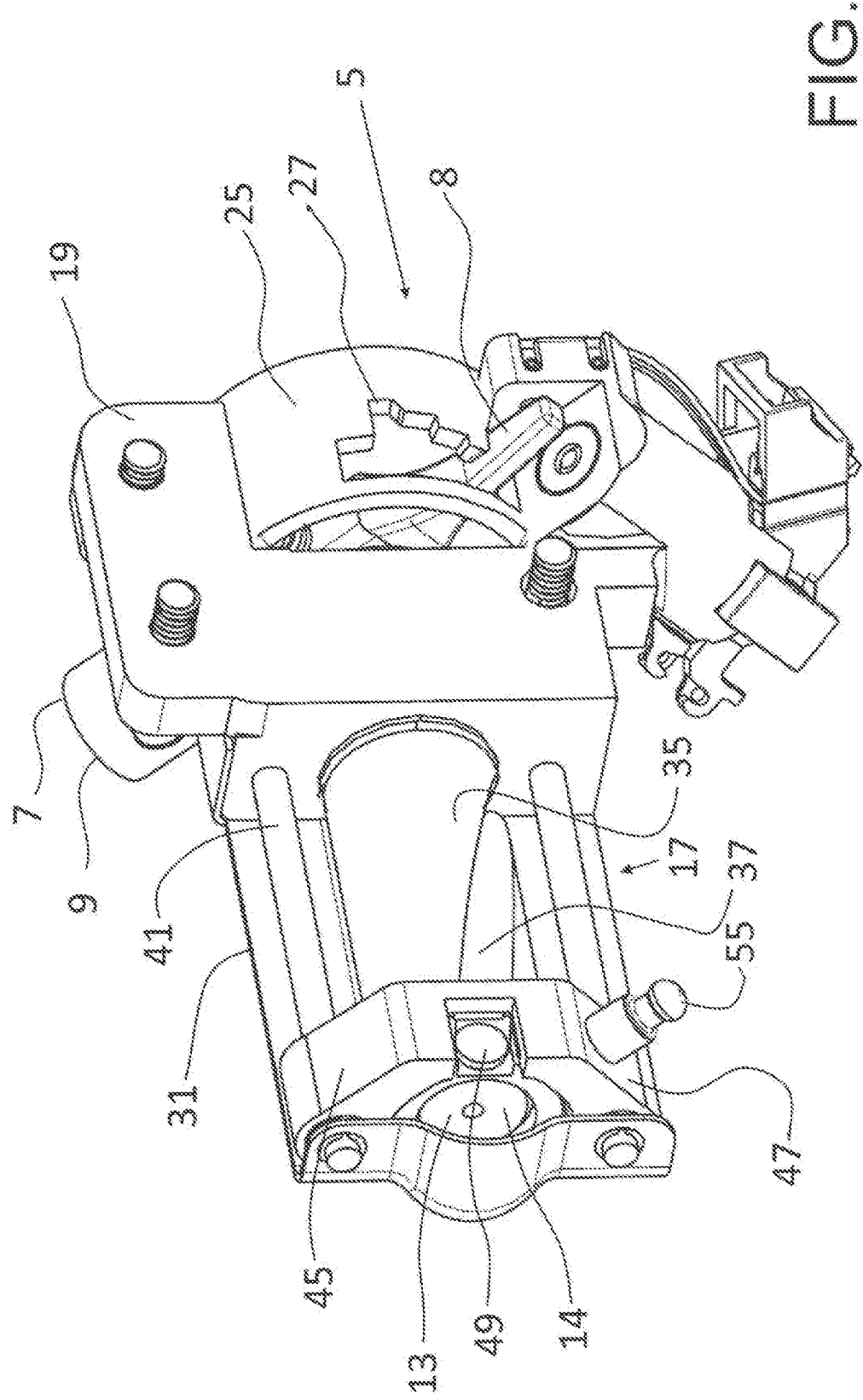
FIG. 1 is a perspective view of the shifter of the present invention.

The invention is directed to a shifter that is used to shift the transmission of a vehicle. The shifter is normally used on vehicles that have automatic transmissions. More particularly, the shifter is designed to take up less space in the area around the steering column of the vehicle. The features of the invention will be more readily understood by referring to the attached drawings in connection with the following description.

Shifter 5 has a lever 9 that is rotatably mounted on the first end 12 of a shaft 13. The shaft 13 is rotatably mounted in a shifter holder 19 that is secured to the steering column of the vehicle. The shifter holder is designed to fit more compactly in the housing 15 that extends around the steering column 21 for the vehicle. The lever 9 has a first end 7 that extends away from the housing 15 and is designed to be engaged by the user of the vehicle to shift the transmission for the vehicle. The lever has a second end 8 that extends into a selector grid 25 that is mounted on the shift holder 19. The selector grid has a plurality of detents 27 that correspond to the various shift positions for the automatic transmission. The lever 9 is spring-loaded by spring 10 to assist the user of the vehicle in selecting the desired shift position for the transmission in a manner that is well known in the art.

The second end 14 of the shaft 13 extends from the shifter holder 19 in a direction opposite to the first end of the shaft. A support plate 31 is secured to the shifter holder and the support plate extends in a direction towards the second end 14 of the shaft 13. A lateral movement device 17 is positioned adjacent the shaft 13 to translate the rotational movement of the shaft to lateral movement. The device 17 is designed to move laterally along the longitudinal axis of the shaft 13. One example of a lateral movement device is a cam housing 35 positioned on the portion of the shaft 13 that extends from the shifter holder 19 adjacent the support plate. The cam housing defines a cam profile 37 that defines a spiral path in the cam housing. At least one guide rod 41 extends from the shifter holder 19 in a direction towards the second end 14 of the shaft 13. In practice, it has been found desirable to have at least two guide rods that extend from the shifter holder 19. The guide rods are disposed to be substantially parallel to the longitudinal axis of the shaft 13. The guide rods 41 are positioned in adjacent spaced apart relationship with the shaft 13. A slide 45 is slidably positioned on the guide rods 41. The guide rods 41 extend through apertures 43 in the slide. A bearing or bushing 46 can be positioned in the aperture to facilitate the sliding movement of the slide on the guide rods. The slide extends around at least a portion of the shaft 13 and the slide extends over the cam profile 37 defined in the cam housing 35 positioned on the shaft 13. A guide pin 49 is positioned on the slide in a location where the guide pin extends into the cam profile 37. The guide pin 49 can be stationary or it can be rotatably mounted in the slide 45. The guide pin 49 is designed to move along or follow the cam profile 37. A cable pin 55 is positioned on an exterior surface 47 of the slide 45. The cable pin 55 is connected to a rod and the rod is connected to the shift mechanism on the transmission for the vehicle.

Devices other than a cam housing or cam profile can be utilized to provide the lateral movement of the lateral movement device 17. A ball screw with an advancing nut (not shown) could be positioned on the shaft 13 so that rotation of the shaft would cause the nut to move in response to the rotation of the shaft and the threads on the ball screw. Attaching a cable pin 55 to the advancing nut would provide a structure that moves laterally along the longitudinal axis of the shaft 13 and is capable of shifting the transmission of the vehicle. Other devices that provide for lateral movement could also be utilized in the invention.

In operation, the lever 9 is moved in an angular direction to position the second end 8 of the lever in different positions in the selector grid 25 to select the desired operating mode for the transmission for the vehicle. In most applications when the lever 9 is in the highest angular position the transmission is in the park mode and when the lever 9 is in the lowest angular position the transmission is in the low/manual drive operational mode. The reverse, neutral and other forward drive positions are located in angular positions between the park and low shift points for the lever 9. There are detents 27 on the selector grid 25 for each of these operational positions for the transmission. Rotation of the lever 9 between the various shift modes for the transmission will cause the shaft 13 to rotate as the lever 9 is moved to various operational modes for the transmission. The rotational movement of the shaft 13 will also cause the cam housing 35 positioned on the shaft to rotate with the shaft. The cam profile 37 positioned in the cam housing will also rotate as the cam housing is rotated by the movement of the lever 9. As the cam 37 rotates the guide pin 49 on the slide 45 will move along the cam profile. The movement of the guide pin 49 will cause the slide 45 to move along the guide rods 41 that support the slide. As the slide 45 is caused to move by the rotation of the cam profile 37 the cable pin 55 positioned on the exterior surface 47 of the slide will also move. As the cable pin 55 is connected to the rod that is operatively connected to the shift mechanism for the transmission, this movement of the cable pin will cause the transmission to shift to the desired operating mode defined by the position of the lever 9 in the detents 27 of the selector grid 25. As shown in the figures the cable pin 55 is adjacent the second end 14 of the shaft 13 when the lever 9 engages the park detent on the selector grid 25. The cable pin is adjacent to the shift holder 19 when the lever 9 engages the low forward operating detent 27 on the selector grid 25. The other operating positions for the transmission will be located between the park and low forward detents 27 on the selector grid 25. The shifter mechanism provides a more compact shifting arrangement for an automatic transmission in a vehicle. The compact size of the shifter reduces the space necessary for the shifter mechanism and allows for a more aesthetically pleasing arrangement of the shifter in the housing 15 that surrounds the steering column for the vehicle.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A shifter for a transmission used on a vehicle comprising:
    a shift lever operatively connected to the transmission, the shifter having a first end and a second end;
    a rotatable shaft connected to the shift lever, the rotatable shaft being positioned in a spaced apart relationship with a steering column for the vehicle, the rotatable shaft rotating in response to movement of the shift lever, the first end of the shift lever extending from the rotatable shaft and being disposed to be engaged by an operator of the vehicle, the second end of the shift lever extending from the rotatable shaft and being disposed to engage a selector grid that shows the shift positions for the transmission;
    a lateral movement device operatively connected to the rotatable shaft, the lateral movement device moving in a direction along the rotatable shaft in response to the rotation of the rotatable shaft, the lateral movement device includes a cam profile positioned on the rotatable shaft, the cam profile extending in a spiral path along the rotatable shaft;
    a cable pin positioned on the lateral movement device, the cable pin being operatively connected to the transmission of the vehicle whereby the movement of the cable pin shifts the transmission and
    a slide is moveably positioned adjacent the rotatable shaft, the slide is moveably mounted on at least one guide rod, the at least one guide rod being disposed in a substantially parallel relationship to the longitudinal axis of the rotatable shaft.

2. The shifter of claim 1 wherein the cam profile is disposed in a cam housing positioned on the rotatable shaft.

3. The shifter of claim 1 wherein a guide pin is positioned on the slide, the guide pin being disposed to engage the cam profile wherein rotation of the cam profile causes the guide pin and the slide to move laterally along the cam profile and longitudinally along the rotatable shaft.

4. The shifter of claim 3 wherein the cable pin is positioned on the slide.

5. The shifter of claim 3 wherein the guide pin is rotatably mounted on the slide.

6. The shifter of claim 1 wherein the slide has at least one aperture containing a bearing surface, the at least one guide rod extending through the at least one aperture.

7. The shifter of claim 6 wherein at least two guide rods are disposed in substantially parallel relationship, the at least two guide rods extending through an aperture on the slide.

* * * * *